(12) United States Patent
Barnes

(10) Patent No.: US 9,070,121 B2
(45) Date of Patent: Jun. 30, 2015

(54) APPROACH FOR PRIORITIZING NETWORK ALERTS

(75) Inventor: James Barnes, Pleasanton, CA (US)

(73) Assignee: Silver Spring Networks, Inc., Redwood City, CA (US)

( * ) Notice: Subject to any disclaimer, the term of this patent is extended or adjusted under 35 U.S.C. 154(b) by 632 days.

(21) Appl. No.: 13/475,472

(22) Filed: May 18, 2012

(65) Prior Publication Data

US 2013/0207801 A1 Aug. 15, 2013

Related U.S. Application Data

(60) Provisional application No. 61/598,546, filed on Feb. 14, 2012.

(51) Int. Cl.
| | |
|---|---|
| *G08B 23/00* | (2006.01) |
| *G06Q 10/10* | (2012.01) |
| *G06Q 50/06* | (2012.01) |
| *H02J 13/00* | (2006.01) |

(52) U.S. Cl.
CPC ............ *G06Q 10/1093* (2013.01); *G06Q 50/06* (2013.01); *H02J 13/0086* (2013.01)

(58) Field of Classification Search
CPC .... G08B 23/00; G01R 19/2513; G01R 19/25; H04L 43/16

USPC ................ 340/519, 517, 540; 702/57, 188, 1; 700/286; 709/224, 223

See application file for complete search history.

(56) References Cited

U.S. PATENT DOCUMENTS 8,423,637 B2 * 4/2013 Vaswani et al. ............... 709/224

* cited by examiner

*Primary Examiner* — Vernal Brown
*Assistant Examiner* — Hongmin Fan
(74) *Attorney, Agent, or Firm* — Artegis Law Group, LLP

(57) ABSTRACT

A computing system receives status transmissions from nodes within a portion of an electricity distribution network. The status transmissions include information related to hardware problems experienced by nodes within the portion of that network. The computing system determines a "heat" value for each of the status transmissions, where the heat value for a given transmission represents the operating conditions of, and/or the severity of hardware/software problems experienced by, the node responsible for sending that transmission. The computing system aggregates the heat values across the entire portion of the electricity distribution network and compares the aggregated heat values to a threshold value. When the aggregated value exceeds the threshold value, the computing system identifies a crisis situation arising within the portion of the electricity distribution network. The computing system may then convey information associated with the status transmissions to operators of the electricity distribution network.

20 Claims, 7 Drawing Sheets

| SOURCES | HEAT 20.1 | HARD ALERTS | SOFT ALERTS | SOURCES | HEAT 35.0 | HARD ALERTS | SOFT ALERTS |
|---|---|---|---|---|---|---|---|
| 510-1 | 10.0 | 1 | 0 | 512-1 | 15.0 | 1 | 2 |
| 510-2 | 5.0 | 1 | 1 | 512-2 | 8.0 | 1 | 1 |
| 510-3 | 1.0 | 0 | 1 | 512-3 | 4.0 | 0 | 1 |
| ... | | | | ... | | | |
| 510-n | .1 | 0 | 1 | 512-M | 1.0 | 0 | 1 |

TOTAL HEAT: 55.1

FIG. 5

APPROACH FOR PRIORITIZING NETWORK ALERTS

CROSS-REFERENCE TO RELATED APPLICATIONS

This application claims benefit of U.S. provisional patent application Ser. No. 61/598,546, filed Feb. 14, 2012, which is hereby incorporated herein by reference.

BACKGROUND

1. Field of the Invention

Embodiments of the present invention relate generally to electricity distribution networks and, more specifically, to an approach for prioritizing network alerts.

2. Description of the Related Art

A network operations center (NOC) is a centralized control station that observes and operates an electricity distribution infrastructure, such as a "smart grid." A smart grid includes a set of interconnected nodes that participate in managing and distributing electricity to consumers. Each node in the smart grid includes a particular type of hardware and performs a given task based on that type of hardware. A given node also includes a monitor that supervises the operation of the hardware within the node and reports status information to the NOC, including data representing the operating condition of the hardware associated with that node. The monitor may also report alert data ("alerts") to the NOC that indicate various hardware problems experienced by the node.

In some situations, a portion of the smart grid may undergo a crisis, during which a large number of nodes within that portion begin to experience hardware problems. The crisis could be caused by a number of factors, including extreme weather or other hardware-damaging events. When a crisis occurs and hardware residing in the smart grid becomes compromised, the affected nodes transmit alerts notifying the NOC of the precise nature of the hardware problems.

Computer systems within the NOC convey those alerts to human operators responsible for managing the NOC, who may then take steps to handle each alert. In general, the NOC operators handle the alerts in the order in which those alerts are received at the NOC. When an alert is received, the NOC computer systems may (i) send an email to one or more of the NOC operators and/or (ii) display the alert on a screen viewable by all NOC operators.

Problems arise during catastrophic events, when the NOC may receive hundreds or thousands of separate alerts. The NOC computer systems respond by sending hundreds or thousands of emails to the NOC operators and/or displaying hundreds or thousands of alerts to the NOC operators. Events of significant magnitude may quickly overwhelm the NOC operators, making it difficult to handle or prioritize the alerts in any meaningful way. Consequently, NOC operators can have quite a bit of difficultly reacting to and managing such events quickly and effectively, which, among other things, can have a substantial negative impact on quality of service.

As the foregoing illustrates, what is needed in the art is a more effective technique for handling alerts that arise within smart networks and other types of electricity distribution infrastructures.

SUMMARY

One embodiment of the present invention sets forth a computer-implemented method for identifying a crisis event arising within a first portion of an electricity distribution network, including receiving a set of status transmissions, where each status transmission in the set of status transmissions is generated by a different node residing within the first portion of the electricity distribution network. The method further includes computing a different heat value for each status transmission in the set of status transmissions, where a first heat value computed for a first status transmission reflects one or more operating conditions associated with a first node that generated the first status transmission. The method also includes computing a total heat value for the first portion of the electricity distribution network by aggregating the heat values computed for the set of status transmissions, comparing the total heat value to a threshold value, determining that the total heat value exceeds the threshold value, and identifying a crisis event arising within the first portion of the electricity distribution network.

One advantage of the disclosed approach is that, when a crisis situation arises, the NOC computing system identifies that crisis based on the urgency and importance values of the alerts caused by the crisis. Further, the NOC computing system conveys useful and meaningful information to the network operators regarding those alerts, making the task of handling the crisis as a whole simpler and more manageable than conventional approaches. In situations where a crisis arises within a given portion of the electricity distribution network and a multitude of alerts are received at the NOC, the NOC operators can formulate a high-level approach to handling the crisis based on the total heat value aggregated across the entire multitude of alerts. Aggregating alerts in this fashion minimizes the amount of time the NOC operators must spend sifting through individual alerts in order to identify the root cause of the crisis situation.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 5 is conceptual diagram that illustrates a screenshot of a graphical user interface (GUI) that includes different sources of heat, according to one embodiment of the invention.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1A:
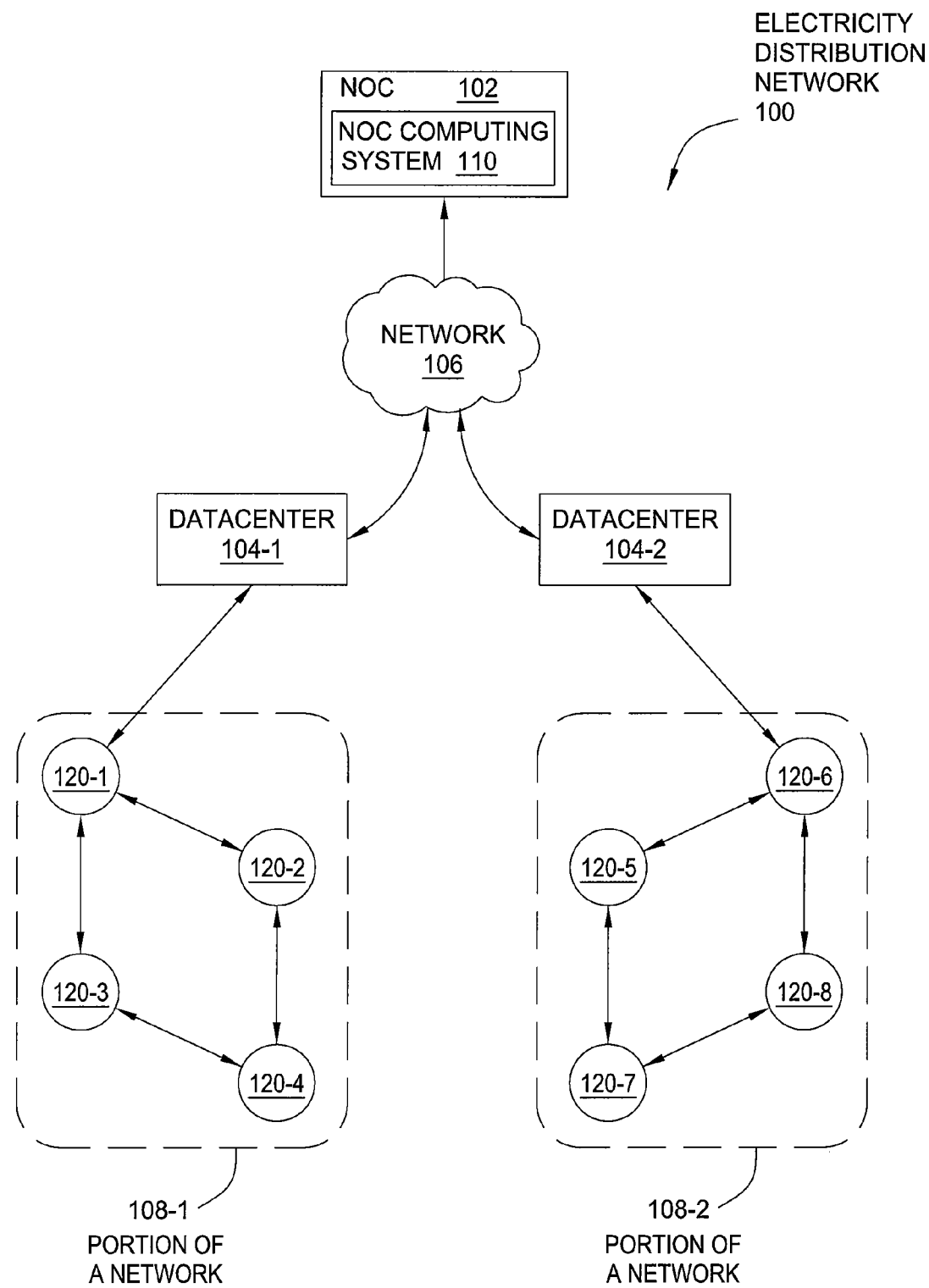
FIG. 1A illustrates an electricity distribution network configured to implement one or more aspects of the present invention.

FIG. 1A illustrates an electricity distribution network 100 configured to implement one or more aspects of the present invention. As shown, electricity distribution network 100 includes a network operations center (NOC) 102 coupled to datacenters 104-1 and 104-2 via a network 106. Datacenters 104 are in turn coupled to portions of a network 108-1 and 108-2. Each of the portions of a network 108 represent a different portion of a computer-controlled electricity distribution infrastructure, referred to herein as a "smart grid." Portions of a network 108 could represent portions of the smart grid residing within a particular geographic region or could represent portions of the smart grid associated with a given customer. The boundaries of each portion of a network 108 may be determined based on any number of different factors or combination of factors.

Datacenters 104 are configured to monitor the status of portions of a network 108 and to report status information back to NOC 102 via network 106. Each datacenter 104 could be, for example, a facility dedicated to housing computer systems and communications systems. Network 106 may be any technically feasible type of communication network, such as the Internet, among other types of networks.

NOC 102 is a centralized control station that manages the overall functionality of electricity distribution network 100. Within NOC 102, NOC operators manually supervise portions of a network 108 (and other portions of the smart grid not shown here) based on the status information reported by datacenters 104. NOC 102 includes NOC computing system 110 that is configured to process the status information reported by datacenters 104. One embodiment of NOC computing system 110 is described below in conjunction with FIG. 1B.

Figure 1B:
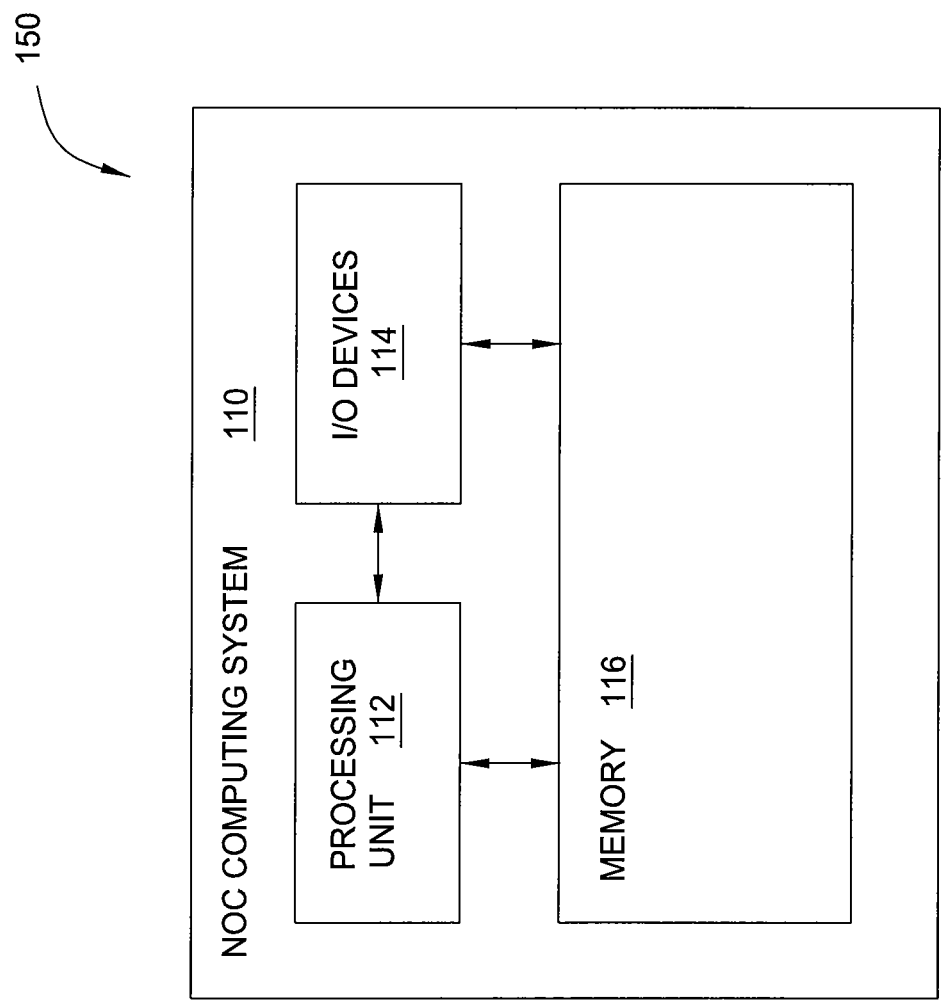
FIG. 1B is a block diagram that illustrates a computing system within the electricity distribution network of FIG. 1A, according to one embodiment of the invention.

FIG. 1B is a block diagram 150 that illustrates computing system 110 within NOC 102 of FIG. 1A, according to one embodiment of the invention. As shown, computing system 110 includes a processing unit 112, input/output (I/O) devices 114, and memory 116. As also shown, processing unit 112, I/O devices 114, and memory 116 are coupled to one another.

Processing unit 112 may include one or more central processing unit (CPUs), parallel processing units (PPUs), graphics processing units (GPUs), application-specific integrated circuits (ASICs), field-programmable gate arrays (FPGAs), or any other type of processing unit capable of processing data. In addition, processing unit 112 may include various combinations of processing units, such as, e.g., a CPU coupled to a GPU.

I/O devices 114 may include input devices, such as a keyboard, a mouse, a touchpad, a microphone, a video camera, and so forth, as well as output devices, such as a screen, a speaker, a printer, a projector, and so forth. In addition, I/O devices 114 may include devices capable of performing both input and output operations, such as a touch screen, an Ethernet port, a universal serial bus (USB) port, a serial port, etc. I/O devices 114, as well as processing unit 112 described above, are both configured to read data from and write data to memory 116.

Memory 116 may include a hard disk, one or more random access memory (RAM) modules, a database, and so forth. In general, memory 116 may be implemented by any technically feasible unit capable of storing data. In one embodiment, memory 116 includes a software program that is executed by processing unit 112 to perform the functionality of NOC computing system 110 described herein.

Persons skilled in the art will recognize that block diagram 150 illustrates just one possible implementation of computing system 110 residing within NOC 102, and that any system or combination of systems configured to perform the functionality of NOC computing system 110 described herein falls within the scope of the present invention.

Referring back now to FIG. 1A, each of the portions of a network 108 may include one or more different nodes 120 that may be coupled to one another and coupled to a corresponding datacenter 104, either directly or indirectly. For example, portion of a network 108-1 includes nodes 120-1, 120-2, 120-3, and 120-4 that are coupled to one another and coupled to datacenter 104-1. Likewise, portion of a network 108-2 includes nodes 120-5, 120-6, 120-7, and 120-8 that are coupled to one another and coupled to datacenter 104-2. Each of nodes 120 may be coupled to one or more other nodes 120 or to a corresponding datacenter 104 via physical cables or wires or via a wireless data connection.

Each of nodes 120 includes hardware and/or software that participates in the overall operation of the electricity distribution network 100. That hardware could be, for example, computing devices or computer system components, among other things, while the software could be, e.g., software applications executing on that hardware. A given node 120 also includes a transceiver (not shown) that allows communication with other nodes 120 and with a given datacenter 104. A node 120 may communicate status information to a datacenter 104 that represents the current operating condition of that node. The operating condition of a given node 120 could be, e.g., a "nominal" operating condition or a "malfunctioning" operating condition, among others. When a node 120 is malfunctioning, the node 120 may be experiencing hardware problems and/or software problems, including transmission problems, communication problems, and so forth. When such problems occur, the node 120 may communicate alert data (i.e. an "alert") to a datacenter 104 corresponding to that node 120.

For example, a given node 120 may transmit an alert to the corresponding datacenter 104 when a hard disk included within the node 120 fails to complete an operation due to insufficient hard disk space. The node may include within the alert some information that specifies the amount of hard disk space remaining. The datacenter 104 then conveys the alert to NOC 102 for processing by NOC computing system 110 and NOC operators. In practice, an alert is a real-time signal that represents the real-time operating condition of a given node 120. NOC 102 may test the node 120 by sampling that real-time signal with a given frequency. That frequency may be configurable based on the number of repeated hardware malfunctions associated with node 120, as discussed in greater detail below.

When NOC 102 receives an alert, NOC computing system 110 assigns to the alert both an "urgency" value and an "importance" value. NOC computing system 110 is configured to determine the urgency value for the alert based on a set of rules associated with the node 120 that transmitted the alert. The set of rules associated with a specific node 120 is generally based on the type of hardware and/or software included within that node. Referring to the example above, if the hardware within a node 120 is a computer hard disk, and the node 120 transmits an alert due to insufficient hard disk space, then NOC computing system 110 may assign an urgency value to the alert based on the amount of hard disk space remaining.

In one embodiment, NOC computing system 110 classifies a given alert as a "soft" alert when the hardware within the node 120 that transmitted the alert has malfunctioned just once. Referring to the example above, if the hard disk included within the node 120 initially fails to complete the operation due to insufficient disk space (i.e., fails for the first time), then NOC 102 would classify the alert associated with the node 120 as a soft alert. NOC 102 may then test the node 120 that transmitted the alert with a higher frequency. For example, prior to identifying the initial hardware malfunction, NOC 102 may test the node 120 every 5 minutes. However, after the alert has initially been received by NOC 102 (and classified by NOC 102 as being "soft"), NOC 102 may then test the node 120 every 1 minute. Persons skilled in the art will recognize that the frequency with which NOC 102 tests nodes 120 before and after initially receiving an alert is a configurable value.

Once NOC 102 has received an initial alert, NOC 102 may then test the node 120 associated with the initial alert with a higher frequency, and, in doing so, NOC 102 may identify repeated hardware malfunctions, thereby verifying that hardware within the node 120 is malfunctioning. After a given number (e.g., three) of such hardware malfunctions, NOC 102 may then re-classify the alert associated with the node 120 as a "hard" alert. In general, NOC 102 may assign an urgency value to a hard alert that is a multiple of the urgency value associated with the initially soft alert. For example, NOC 102 may assign an urgency value of 0.1 to an initial, soft alert. Then, after NOC 102 identifies repeated hardware malfunctions and re-classifies the soft alert as a hard alert, NOC 102 may then re-assign the urgency value of the alert to be equal to 1. An advantage of monitoring both soft and hard alerts is that NOC 102 may identify sweeping hardware failures (i.e., hardware failures across many nodes 120 within a portion of a network 108) after identifying multiple initial, as-of-yet unverified hardware failures.

NOC computing system 110 is configured to determine the importance value for a particular alert based on a different set of factors than used to determine the urgency value for the alert. For example, NOC computing system 110 may determine the importance value for a given alert based on the particular customer to whom the node that transmitted the alert belongs, or based on the particular portion of a network within which that node resides. In general, NOC computing system 110 determines the importance level for a given alert based on factors external to the hardware/software included within the node that transmitted the alert.

In operation, NOC 102 may receive thousands of alerts in a short period of time, especially when a crisis situation arises within a given portion of a network 108 and many nodes 120 within that portion are experiencing problems. NOC computing system 110 is configured to assign an urgency value and an importance value to each received alert and to then compute a "heat" value for each such alert based on the assigned urgency and importance values. In one embodiment, NOC computing system 110 determines the heat value for a given alert by multiplying the urgency value associated with the alert by the importance value associated with the alert, as discussed in greater detail below in conjunction with FIG. 2. NOC computing system 110 may then prioritize the alerts based on the corresponding heat values, as discussed in greater detail below in conjunction with FIGS. 3-6.

Figure 2:
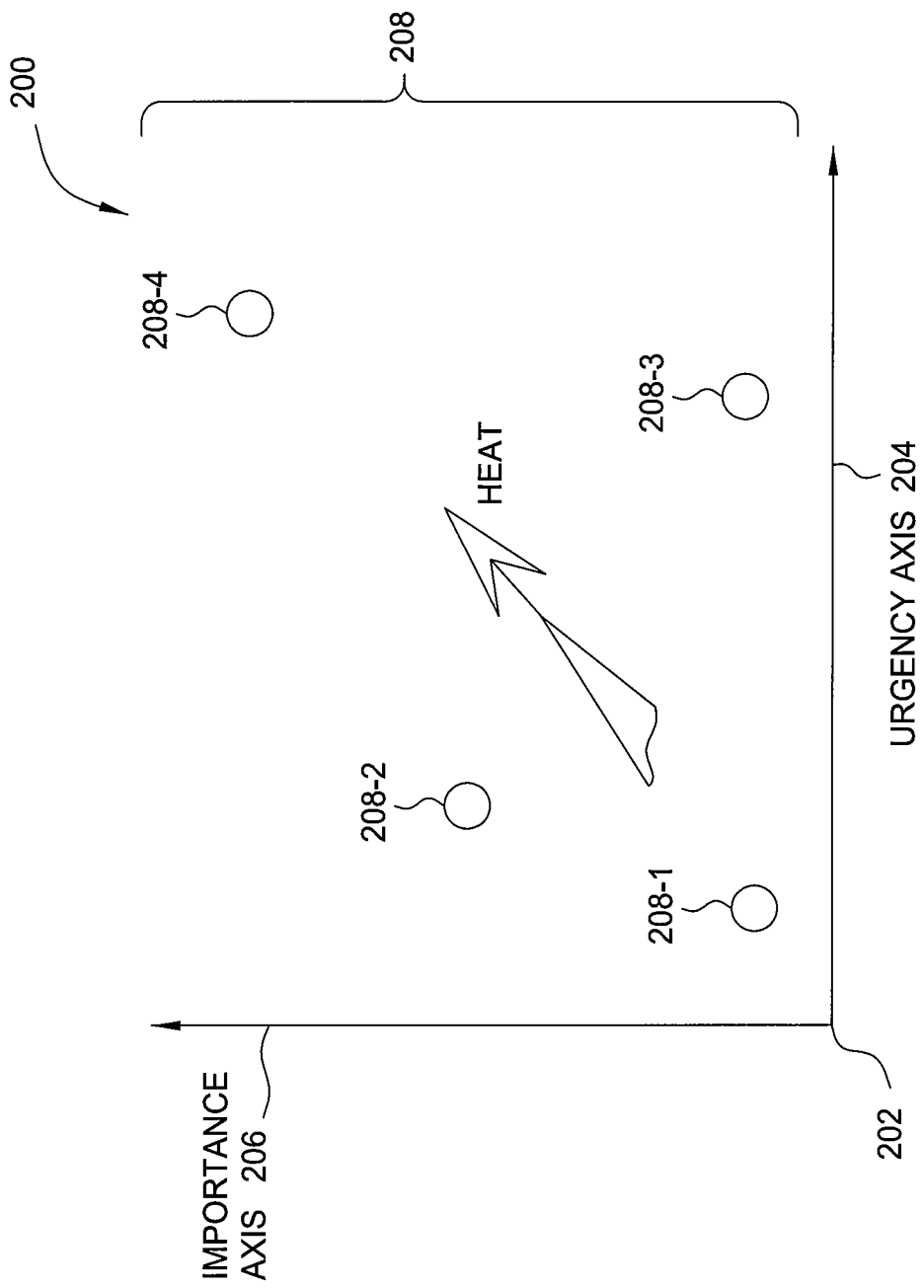
FIG. 2 is a conceptual diagram that illustrates a set of alerts displayed based on urgency and importance values, according to one embodiment of the invention.

FIG. 2 is a conceptual diagram 200 that illustrates a set of alerts 208 displayed based on urgency values and importance values, according to one embodiment of the invention. As shown, conceptual diagram 200 includes a graph 202 constructed with an urgency axis 204 and an importance axis 206. Alerts 208-1, 208-2, 208-3, and 208-4 are plotted on graph 202 based on the urgency values and importance values associates with those alerts. The position of a given alert on graph 202 reflects the heat value associated with that alert. In one embodiment, the heat value associated with a particular alert is equal to the urgency value of the alert multiplied by the importance value of the alert. In general, the heat value associated with different locations on graph 202 increases towards the upper-right side of graph 202. Graph 202 represents just one possible technique for visualizing the heat values associated with a set of alerts 208.

In one embodiment, the heat value for a given alert 208 is a function of time. For example, the heat value for a given alert 208 could increase over time, so that the heat value corresponding to the alert increases from an initial value to some maximum value, i.e. the alert 208 gradually drifts towards the upper-right side of graph 202 over time. This increase could occur in response to the urgency level of the alert increasing over time and/or the importance level of the alert increasing over time. In another example, the heat value for a given alert 208 could decay over time, so that the heat value corresponding to the alert decreases from an initial value to some minimum value, i.e. the alert 208 gradually drifts towards the lower-left side of graph 202 over time. This decay could occur in response to the urgency level of the alert decaying over time and/or the importance level of the alert decaying over time.

Once NOC computing system 110 (shown in FIGS. 1A-1B) determines a heat value for each individual alert received from a given portion of a network 108 (shown in FIG. 1A), NOC computing system 110 then aggregates those heat values and determines a "total heat" value for that portion of a network 108. When the total heat value or a given portion of a network 108 exceeds a threshold value, NOC computing system 110 prioritizes the alerts associated with that portion of a network 108 and conveys the prioritized alerts to the NOC operators for management, as described in greater detail below in conjunction with FIG. 3.

Figure 3:
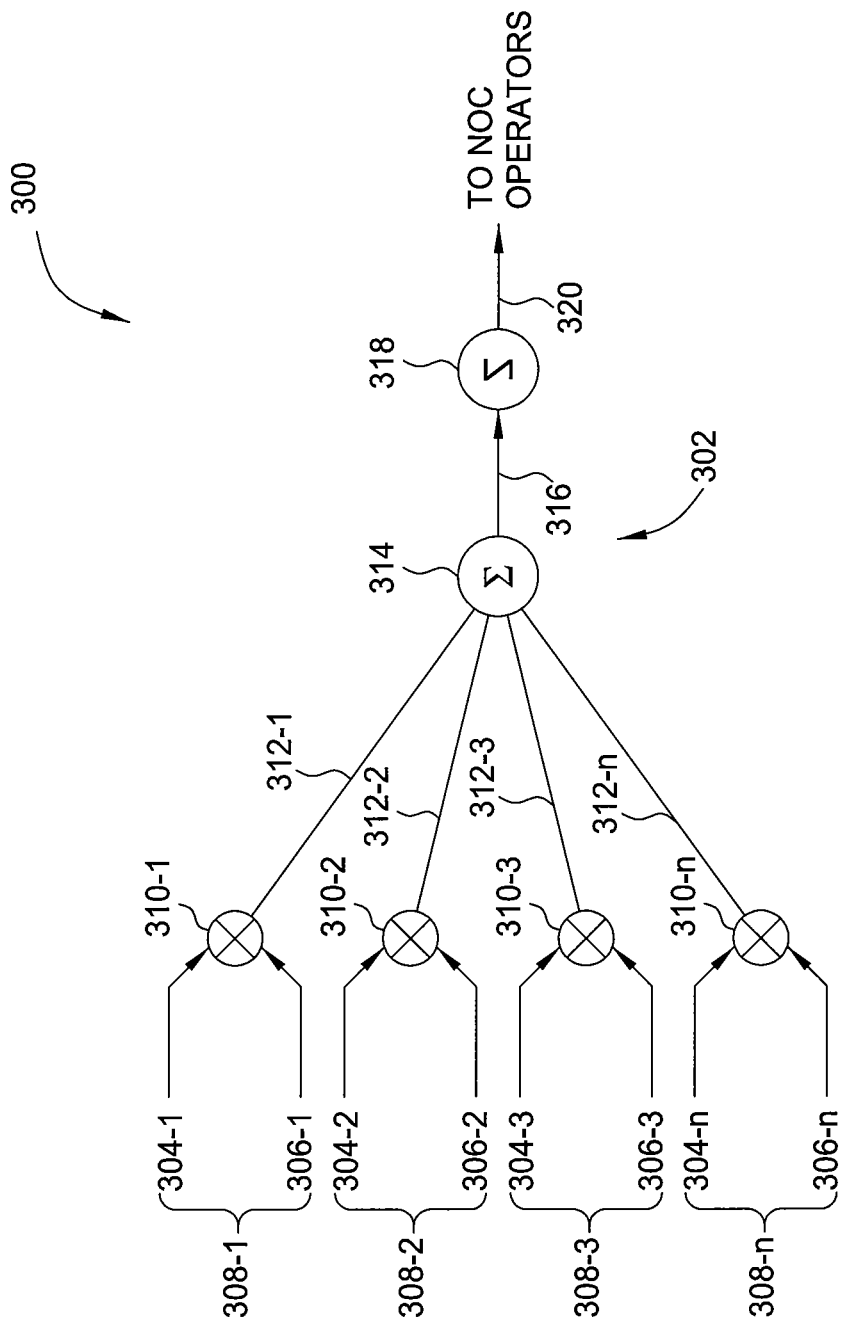
FIG. 3 is a conceptual diagram that illustrates a portion of a neural network configured to compute a total heat value for a set of alerts, according to one embodiment of the invention.

FIG. 3 is a conceptual diagram 300 that illustrates a portion of a neural network 302 configured to compute a total heat value for alerts 308, according to one embodiment of the invention. The functionality of portion of a neural network 302, as described herein, may be implemented by NOC computing system 110 (shown in FIGS. 1A-1B). As shown, each alert 308 has an associated urgency value 304 and importance value 306. NOC computing system 110 is configured to determine the urgency value and importance value for each alert in the fashion described above in conjunction with FIG. 1.

For each alert 308, a multiply unit 310 multiplies the corresponding urgency value 304 with the corresponding importance value 306 to produce a heat value 312. For example, in order to produce heat value 312-1 associated with alert 308-1, multiply unit 310-1 multiplies urgency value 304-1 with importance value 306-1. Once a heat value 312 has been produced for each alert 308, a sum unit 314 accumulates the heat values 312 across all alerts 308 and produces a total heat value 316. Total heat value 316 may represent an overall measure of the "severity" of hardware/software problems occurring within the portion of a network that produced alerts 308.

A threshold unit 318 then compares the total heat value 316 to a threshold value and determines whether the total heat value 316 exceeds that threshold value. The threshold value could be determined empirically based on observed heat values, or could be determined dynamically based on statistical averaging. For example, the threshold value could be determined at regular intervals by computing N times the average total heat value taken over T seconds, where N and T are real numbers. Persons skilled in the art will understand that the threshold value used by threshold unit 318 could be determined through any technically feasible approach.

When threshold unit 318 determines that the total heat value 316 exceeds the threshold value, then NOC computing system 110 prioritizes alerts 308 based on the individual heat values 312 corresponding to those alerts and conveys the prioritized alerts to the NOC operators. NOC computing system 110 also notifies the NOC operators that a crisis situation may be arising within a particular portion of a network.

When threshold unit 318 determines that the total heat value 316 does not exceed the threshold value, then NOC computing system 110 may simply convey the alerts 308, along with the individual heat values associated with those alerts, to the NOC operators, without prioritizing the alerts 308 or indicating that a crisis is arising.

In one embodiment, the electricity distribution network 100 shown in FIG. 1A is organized according to a hierarchical structure, where each portion of a network 108 includes one or more sub-portions, each of which is associated with a different portion of a neural network (such as portion of a neural network 302). With this configuration, a different portion of a neural network aggregates heat values for the nodes within each different sub-portion. Further, an over-arching portion of a neural network may aggregate heat values generated for each sub-portion, thereby producing a total heat value for that portion of a network based on the heat values of the corresponding sub-portions. In general, multiple portions of a neural network 302 may be organized and coupled together according to a hierarchical structure that includes any number of different layers, where each layer includes any number of different portions of a neural network.

The functionality of portion of a neural network 302 is discussed in greater detail below in conjunction with FIG. 4.

Figure 4:
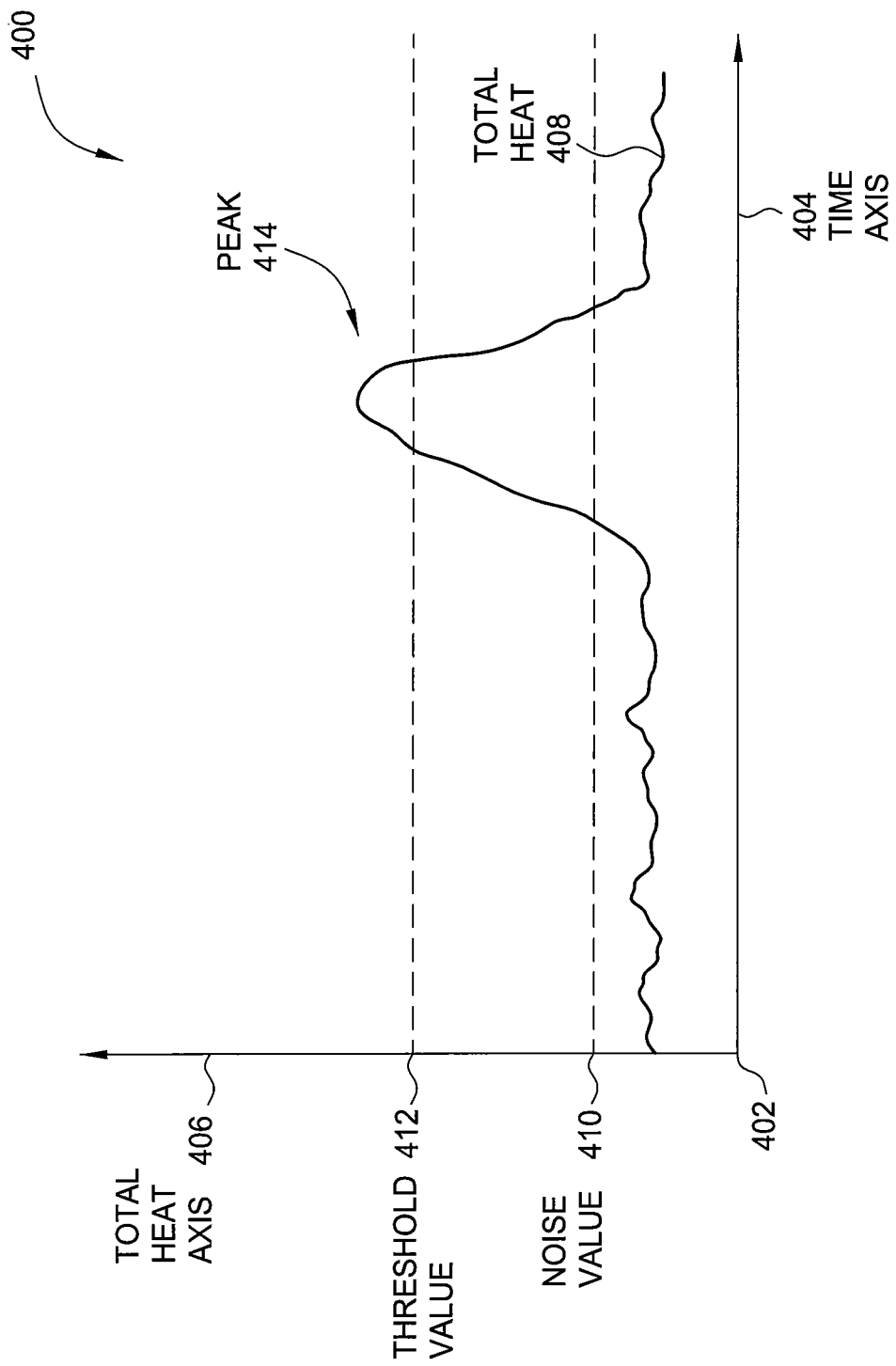
FIG. 4 is a conceptual diagram that illustrates a total heat value for a portion of a network over a given period of time, according to one embodiment of the invention.

FIG. 4 is a conceptual diagram that illustrates a total heat value 408 associated with a portion of a network 108 (shown in FIG. 1A) over a given period of time, according to one embodiment of the invention. As shown, conceptual diagram 400 includes a graph 402 constructed with a time axis 404 and a total heat axis 406. Total heat 408 is plotted against time axis 404 and total heat axis 406. A noise value 410 represents a "nominal" level of total heat for the portion of a network 108, whereas threshold value 412 represents a "crisis" level of total heat for that portion. As is shown, peak 414 in total heat 408 exceeds threshold 412. Accordingly, peak 414 represents a crisis situation that is arising. When a crisis situation arises, NOC computing system 110 conveys prioritized alerts to the NOC operators and notifies the NOC operators that a crisis may be arising within a particular portion of a network 108. FIG. 5 illustrates one example of information conveyed by NOC computing system 110 to NOC operators during a crisis.

FIG. 5 is a conceptual diagram 500 that illustrates a screenshot of a graphical user interface (GUI) 502 that includes different sources of heat, according to one embodiment of the invention. As shown, GUI 502 includes a header 504 and is divided into columns 506-1 and 506-2. Column 506-1 includes header 508-1 and column 506-2 includes header 508-2. Each column 506 includes a prioritized list of "sources" that represent sources of heat. Column 506-1 includes sources 510, while column 506-2 includes sources 512. Each of sources 510 and 512 could be an individual alert that has an associated heat value, a portion of a network that has an associated total heat value, or a sub-portion of a given portion of a network that has an associated total heat value.

Each source 510 and 512 is displayed within GUI 502 along with the corresponding heat value. When a given source is an individual alert, the heat value for that source represents an individual heat value computed based on an urgency value and an importance value associated with the individual alert, in the fashion described above in conjunction with FIG. 2. When a given source is a portion of a network (or a sub-portion), the heat value for that source represents a total heat value computed using the techniques described above in conjunction with FIG. 3. Each source 510 or 512 may also be displayed within GUI 502 along with a number of hard alerts and a number of soft alerts.

As is shown, header 508-1 of column 506-2 and header 508-1 of column 506-2 both include a total heat value. The heat value for a given column 506 represents the aggregated heat values across all sources (510 or 512). In like fashion, header 504 of GUI 502 indicates the aggregated heat values across all columns 506, i.e. across all alerts or across all portions of a network, sub-portions, etc. In general, a total heat value may be computed for any collection of sources, including collections of individual alerts as well as collections of portions of a network or sub-portions.

In one example, the total heat value shown in header 504 represents the total heat value for the electricity distribution network 100 (shown in FIG. 1A) as a whole. In like fashion, the heat value shown in header 508-1 represents the total heat value for portion of a network 108-1 and the heat value shown in header 508-2 represents the total heat value for portion of a network 108-2. Each of the heat values shown in headers 508-1 and 508-2 is computed based on urgency and importance values associated with the nodes 120 residing within portions of a network 108-1 and 108-2, respectively. In this example, a different portion of a neural network (such as that shown in FIG. 3) may be used to generate the different heat values shown in headers 508-1 and 508-2. Further, a portion of a neural network may be used to aggregate those heat values to generate the total heat value shown in header 504.

In another example, the total heat value shown in header 504 represents the total heat value for portion of a network 108-1 (shown in FIG. 1A). In this example, the heat value shown in header 508-1 represents the total heat value for a sub-portion of portion of a network 108-1 and the heat value shown in header 508-2 represents the total heat value for a different sub-portion of portion of a network 108-2. Each such heat value is computed based on urgency and importance values associated with different nodes 120 residing within portion of a network 108-1. In this example, a different portion of a neural network (such as that shown in FIG. 3) may be used to generate the different heat values shown in headers 508-1 and 508-2. Further, an over-arching portion of a neural network may be used to aggregate those heat values to generate the total heat value shown in header 504.

NOC computing system 110 may generate GUI 502 in order to convey alert information to NOC operators. Using GUI 502, NOC operators within NOC 102 may quickly manage crisis situations by observing total heat values across multiple portions of a network (and sub-portions) and within individual portions of a network (and sub-portions). In various embodiments, NOC computing system 110 may display GUI 502 to the NOC operators, including prioritized alert information, regardless of whether a crisis situation exists. The overall functionality of NOC computing system 110 relative to crisis management is discussed in greater detail below in conjunction with FIG. 6.

Figure 6:
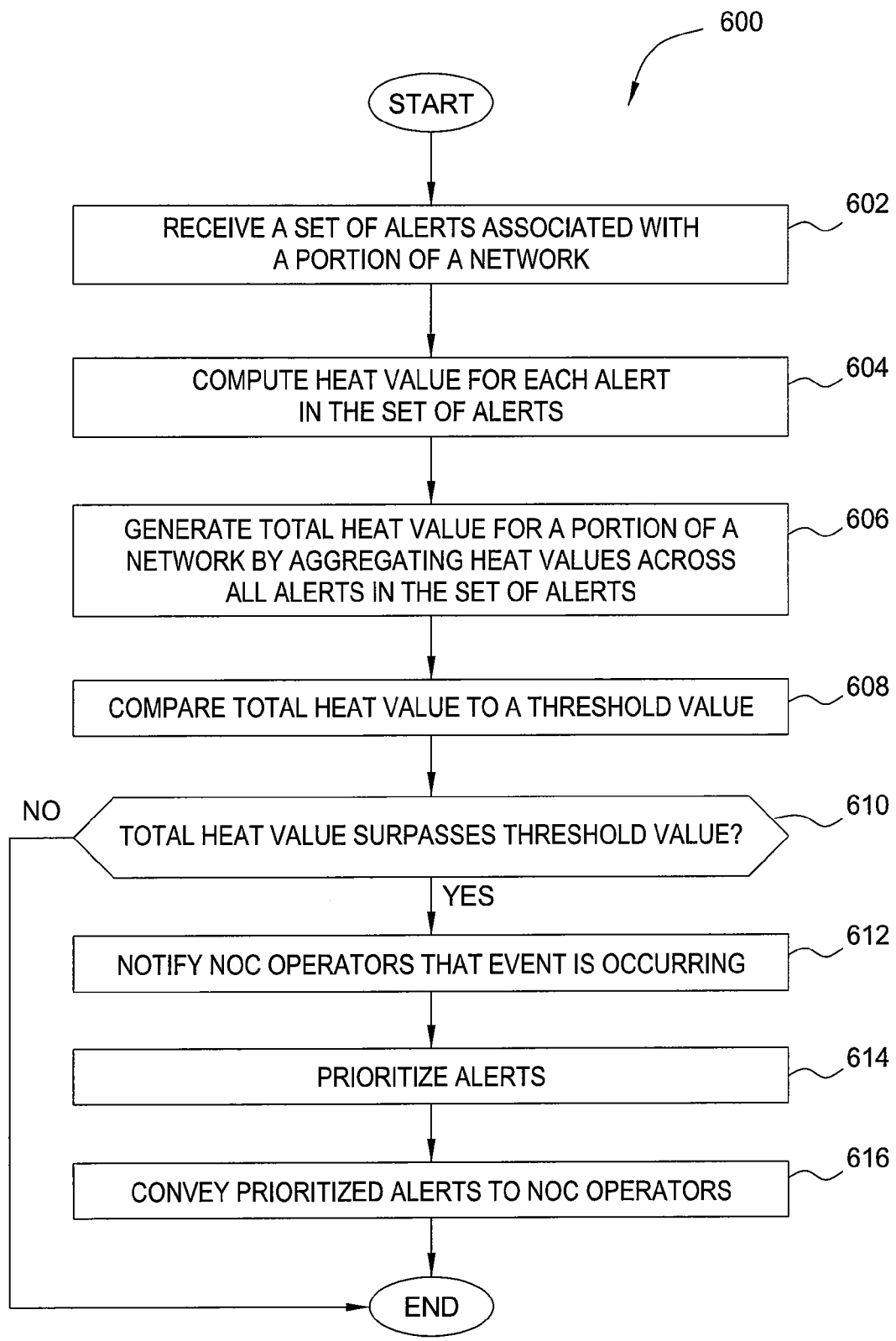
FIG. 6 is a flowchart of method steps for prioritizing alerts associated with an electricity distribution network, according to one embodiment of the invention.

FIG. 6 is a flowchart of method steps for prioritizing alerts associated with electricity distribution network 100, according to one embodiment of the invention. Although the method steps are described in conjunction with the systems of FIGS. 1A and 1B, persons skilled in the art will understand that any system configured to perform the method steps, in any order, is within the scope of the present invention. In one embodiment, the method 600 may be performed by NOC computing system 110 shown in FIGS. 1A and 1B.

As shown, the method 600 begins at step 602, where NOC computing system 110 receives a set of alerts associated with a given portion of a network. The portion of a network could be, e.g., portion of a network 108-1 or 108-2 shown in FIG. 1A. Each alert represents a status transmission received from a node 120 within electricity distribution network 100.

At step 604, NOC computing system 110 computes a heat value for each alert in the set of alerts. NOC computing system 110 computes the value for a given alert based on an urgency value associated with the alert with an importance value also associated with the alert. NOC computing system 110 determines the urgency value for a given alert based on a set of rules associated with the node 120 that transmitted the alert. NOC computing system 110 determines the importance value based on other factors, such as the customer to which the node 120 belongs or the portion of a network 108 within which the node 120 resides.

At step 606, NOC computing system 110 generates a total heat value for the portion of a network by aggregating (e.g., summing) the individual heat values across all alerts in the set of alerts. At step 608, NOC computing system 110 compares the total heat value to a threshold value. At step 610, NOC computing system 110 determines whether the total heat value exceeds the threshold value. When NOC computing system 110 determines that the total heat value does not exceed the threshold value, then the method 600 ends. When NOC computing system 110 determines that the total heat value does exceed the threshold value, then the method 600 proceeds to step 612.

At step 612, NOC computing system 110 notifies the NOC operators that an "event" may be occurring, such as, e.g., a crisis situation that is arising. At step 614, NOC computing system 110 prioritizes the alerts in the set of alerts based on the individual heat values associated with those alerts. At step 616, NOC computing system 110 conveys the prioritized alerts to the NOC operators. NOC computing system 110 could, for example, display prioritized alerts on a screen viewable to all NOC operators within NOC 102.

In sum, a computing system receives status transmissions from nodes within a portion of an electricity distribution network. The status transmissions include information related to hardware problems experienced by nodes within the portion of that network. The computing system determines a "heat" value for each of the status transmissions, where the heat value for a given transmission represents the operating conditions of, and/or the severity of hardware/software problems experienced by, the node responsible for sending that transmission. The computing system aggregates the heat values across the entire portion of the electricity distribution network and compares the aggregated heat values to a threshold value. When the aggregated value exceeds the threshold value, the computing system identifies a crisis situation arising within the portion of the electricity distribution network. The computing system may then convey information associated with the status transmissions to operators of the electricity distribution network.

Advantageously, when a crisis situation arises, the NOC computing system identifies that crisis based on the urgency and importance values of the alerts caused by the crisis. Further, the NOC computing system conveys useful and meaningful information to the network operators regarding those alerts, making the task of handling the crisis as a whole simpler and more manageable than conventional approaches. In situations where a crisis arises within a given portion of the electricity distribution network and a multitude of alerts are received at the NOC, the NOC operators can formulate a high-level approach to handling the crisis based on the total heat value aggregated across the entire multitude of alerts. Aggregating alerts in this fashion minimizes the amount of time the NOC operators must spend sifting through individual alerts in order to identify the root cause of the crisis situation.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

I claim:

1. A computer-implemented method for identifying a crisis event arising within a first portion of an electricity distribution network, the method comprising:
  receiving a set of status transmissions, wherein each status transmission in the set of status transmissions is generated by a different node residing within the first portion of the electricity distribution network;
  computing a different heat value for each status transmission in the set of status transmissions, wherein a first heat value computed for a first status transmission reflects one or more operating conditions associated with a first node that generated the first status transmission;
  computing a total heat value for the first portion of the electricity distribution network by aggregating the heat values computed for the set of status transmissions;
  comparing the total heat value to a threshold value;
  determining that the total heat value exceeds the threshold value; and
  identifying a crisis event arising within the first portion of the electricity distribution network.

2. The computer-implemented method of claim 1, further comprising:
  notifying an operator of the electricity distribution network that a crisis event is arising within the first portion of the electricity distribution network;

prioritizing the status transmissions in the set of status transmissions based on the heat value computed for each status transmission in the set of status transmissions; and
conveying the prioritized status transmissions to the operator of the electricity distribution network.

3. The computer-implemented method of claim 1, wherein computing the first heat value comprises multiplying a first urgency value associated with the first status transmission with a first importance value associated with the first status transmission.

4. The computer-implemented method of claim 3, further comprising determining the first urgency value based on the type of hardware associated with the first node.

5. The computer-implemented method of claim 3, further comprising determining the first importance value based on the identity of a customer associated with the first node.

6. The computer-implemented method of claim 1, further comprising computing the first heat value based on an amount of time elapsed since the first node generated the first status transmission.

7. The computer-implemented method of claim 1, further comprising computing the threshold value dynamically based on averaging total heat values computed periodically for the first portion of the electricity distribution network.

8. The computer-implemented method of claim 1, wherein the one or more operating conditions associated with the first node includes a set of hardware malfunctions and/or software malfunctions.

9. A non-transitory computer-readable medium storing program instruction that, when executed by a processing unit, cause the processing unit to identify a crisis event arising within a first portion of an electricity distribution network by performing the steps of:
receiving a set of status transmissions, wherein each status transmission in the set of status transmissions is generated by a different node residing within the first portion of the electricity distribution network;
computing a different heat value for each status transmission in the set of status transmissions, wherein a first heat value computed for a first status transmission reflects one or more operating conditions associated with a first node that generated the first status transmission;
computing a total heat value for the first portion of the electricity distribution network by aggregating the heat values computed for the set of status transmissions;
comparing the total heat value to a threshold value;
determining that the total heat value exceeds the threshold value; and
identifying a crisis event arising within the first portion of the electricity distribution network.

10. The non-transitory computer-readable medium of claim 9, further comprising the steps of:
notifying an operator of the electricity distribution network that a crisis event is arising within the first portion of the electricity distribution network;
prioritizing the status transmissions in the set of status transmissions based on the heat value computed for each status transmission in the set of status transmissions; and
conveying the prioritized status transmissions to the operator of the electricity distribution network.

11. The non-transitory computer-readable medium of claim 9, wherein the step of computing the first heat value comprises multiplying a first urgency value associated with the first status transmission with a first importance value associated with the first status transmission.

12. The non-transitory computer-readable medium of claim 11, further comprising the step of determining the first urgency value based on the type of hardware associated with the first node.

13. The non-transitory computer-readable medium of claim 11, further comprising the step of determining the first importance value based on the identity of a customer associated with the first node.

14. The non-transitory computer-readable medium of claim 9, further comprising the step of computing the first heat value based on an amount of time elapsed since the first node generated the first status transmission.

15. The non-transitory computer-readable medium of claim 9, further comprising the step of computing the threshold value dynamically based on averaging total heat values computed periodically for the first portion of the electricity distribution network.

16. The non-transitory computer-readable medium of claim 9, wherein the one or more operating conditions associated with the first node includes a set of hardware malfunctions and/or software malfunctions.

17. A computing device configured to identify a crisis event arising within a first portion of an electricity distribution network, comprising:
a processing unit configured to:
receive a set of status transmissions, wherein each status transmission in the set of status transmissions is generated by a different node residing within the first portion of the electricity distribution network;
compute a different heat value for each status transmission in the set of status transmissions, wherein a first heat value computed for a first status transmission reflects one or more operating conditions associated with a first node that generated the first status transmission;
compute a total heat value for the first portion of the electricity distribution network by aggregating the heat values computed for the set of status transmissions;
compare the total heat value to a threshold value;
determine that the total heat value exceeds the threshold value;
identify a crisis event arising within the first portion of the electricity distribution network;
notify an operator of the electricity distribution network that a crisis event is arising within the first portion of the electricity distribution network;
prioritize the status transmissions in the set of status transmissions based on the heat value computed for each status transmission in the set of status transmissions; and
convey the prioritized status transmissions to the operator of the electricity distribution network.

18. The computing device of claim 17, further comprising:
a memory coupled to the processing unit and storing program instructions that, when executed by the processing unit, cause the processing unit to:
receive the set of status transmissions;
compute the different heat value for each status transmission in the set of status transmissions;
compute the total heat value for the first portion of the electricity distribution network;
compare the total heat value to the threshold value;
determine that the total heat value exceeds the threshold value;
identify the crisis event arising within the first portion of the electricity distribution network;

notify the operator of the electricity distribution network that a crisis event is arising within the first portion of the electricity distribution network;
prioritize the status transmissions in the set of status transmissions; and
convey the prioritized status transmissions to the operator of the electricity distribution network.

19. The computing device of claim 17, wherein the processing unit is further configured to:
compute the first heat value by multiplying a first urgency value associated with the first status transmission with a first importance value associated with the first status transmission;
determine the first urgency value based on the type of hardware associated with the first node; and
determine the first importance value based on the identity of a customer associated with the first node.

20. The computing device of claim 17, wherein the processing unit is further configured to:
compute the first heat value based on an amount of time elapsed since the first node generated the first status transmission; and
compute the threshold value dynamically based on averaging total heat values computed periodically for the first portion of the electricity distribution network.

* * * * *